United States Patent Office 3,488,181
Patented Jan. 6, 1970

3,488,181
DIAMINO-s-TRIAZINE HERBICIDES
Erwin Nikles, Liestal, Switzerland, assignor to Ciba Limited, Basel, Switzerland, a company of Switzerland
No Drawing. Original application Jan. 12, 1967, Ser. No. 608,746. Divided and this application Oct. 24, 1968, Ser. No. 785,428
Claims priority, application Switzerland, Jan. 28, 1966, 1,173/66
Int. Cl. A01n 9/22
U.S. Cl. 71—93                                     2 Claims

ABSTRACT OF THE DISCLOSURE

The triazines of the following formula are especially suitable for controlling weeds in monocotyledonous cultures, without affecting the growth of the culture plants

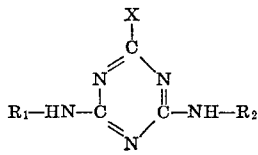

wherein X represents chlorine, methoxy or methylmercapto, $R_1$ represents lower alkyl or alkoxy alkyl, and $R_2$ represents a doubly branched alkyl of 6 to 8 carbon atoms.

---

This application is a division of my copending application Ser. No. 608,746, filed Jan. 12, 1967.

The present invention provides pesticidal preparations, especially herbicidal preparations, comprising, as active ingredient, a compound of the general formula

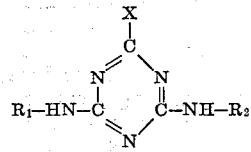  (I)

in which X represents a chlorine atom or a methoxy or methylmercapto group, $R_1$ represents a lower alkyl or alkoxyalkyl radical and $R_2$ represents a doubly branched alkyl radical containing 6 to 8 carbon atoms.

Swiss Patent 329,277 discloses as herbicides, triazine derivatives of the formula

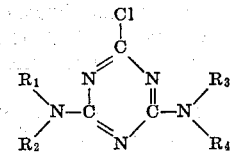  (II)

in which $R_1$, $R_2$, $R_3$ and $R_4$ each represents a hydrogen atom or an alkyl, alkenyl, aralkyl or cycloalkyl radical, or $R_1$ and $R_2$ or $R_3$ and $R_4$ represent alkylene radicals which are bound together by the free valency directly or through a further hetero atom.

Furthermore, Swiss Patent 337,019 discloses, as further herbicides, triazine derivatives of the formula

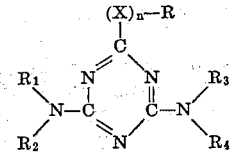  (III)

in which X represents an oxygen or a sulphur atom, $n=0$ or 1, and $R_1$ to $R_4$ each represents a hydrogen atom or a hydrocarbon residue.

The present invention is based on the unexpected observation that triazine derivatives of the general Formula I display a selectivity not found in triazines of the Formulae II and III. The triazines of the Formula I are especially suitable for controlling weeds in monocotyledonour cultures, without affecting the growth of the culture plants.

The triazine derivatives of the Formula I have a distinct selectivity in wheat and carrots.

The new triazine derivatives may be prepared by known methods, by reacting a cyanuric halide with an amine of the formula $R_1$—$NH_2$, an amine of the formula $R_2$—$NH_2$ and methanol or methanethiol, preferably in the alcoholate form, the reactions being carried out in any desired order of sequence. Such reactions have been abundantly described in the literature, so that it is unnecessary to describe the reaction conditions here. As examples of amines of the formula $R_1$—$NH_2$ there may be mentioned: α,β-dimethyl-butylamine, α-γ-dimethyl-butylamine, α,β-dimethyl-pentylamine, α,γ-dimethyl-pentylamine, α,δ-dimethyl-pentylamine, β-ethyl-α-methyl-butylamine, α,β-dimethyl-hexylamine and α,δ-dimethyl-hexylamine.

As examples of amines of the formula $R_2NH_2$, there may be mentioned: methylamine, ethylamine, isopropylamine, secondary butylamine, β-methoxy-ethylamine, γ-methoxy-propylamine and γ-isopropoxy-propylamine.

As compounds of the Formula I, obtained by the present process there may be mentioned:

2-chloro-4-(α,δ-dimethyl-pentylamino)-6-
  (γ-methoxy-propylamino)-1,3,5-triazine,
2-ethylamino-4-chloro-6-(α,δ-dimethyl-
  pentylamino)-1,3,5-triazine,
2-chloro-4-(α,β-dimethyl-pentylamino)-6-methyl-
  amino-1,3,5-triazine,
2-(α,γ-dimethyl-pentylamino-4-isopropyl-
  amino)-6-methoxy-1,3,5-triazine,
2-(α,β-dimethyl-pentylamino)-4-methylamino-6-
  methylmercapto-1,3,5-triazine,
2-(α,γ-dimethyl-butylamino)-4-methoxy-6-
  (γ-methoxypropylamino)-1,3,5-triazine,
2-(α,γ-dimethyl-butylamino)-4-methoxy-6-
  methylamino-1,3,5-triazine,
2-ethylamino-4-(α,γ-dimethyl-butylamino)-6-
  methoxy-1,3,5-triazine,
2-(α,γ-dimethyl-butylamino)-4-isopropylamino-6-
  methoxy-1,3,5-triazine,
2-α,γ-dimethyl-butylamino)-4-(γ-methoxypropyl-
  amino)-6-methylmercapto-1,3,5-triazine,
2-ethylamino-4-(α,γ-dimethyl-butylamino)-6-methyl-
  mercapto-1,3,5-triazine,
2-(α,β-dimethyl-butylamino)-4-methoxy-6-(γ-methoxy-
  propylamino)-1,3,5-triazine,
2-(α,γ-dimethylbutylamino)-4-methylamino-6-
  methylmercapto-1,3,5-triazine and
2-(α,ε-dimethyl-hexylamino)-4-methoxy-6-(γ-methoxy-
  propylamino)-1,3,5-triazine.

The preparations containing the compounds of this invention may be manufactured in widely differing forms according to their intended application. When manufacturing solutions of compounds of the general Formula I for direct spraying there may be used, for example, mineral oil fractions of medium to high boiling range, preferably those boiling above 100° C., for example diesel oil or kerosene, coal tar oils and oils of vegetable or animal origin, as well as hydrocarbons for example, alkylated naphthalenes, tetrahydronaphthalene, if desired in combination with xylene mixtures, cyclohexanols or ketones, also chlorinated hydrocarbons for example, tri- and tetrachloroethane, trichloroethylene or tri- and tetrachlorobenzenes.

Aqueous forms of the preparations are manufactured, for example, from emulsion concentrates, pastes or wettable spray powders by the addition of water thereto. Suitable emulsifiers or dispersants are, for example, nonionic products, for example, condensation products of ethylene oxide with aliphatic alcohols, amines or carboxylic acids with a long-chain hydrocarbon residue containing about 10 to 20 carbon atoms, for example the condensation product of octadecyl with 25 to 30 mols of ethylene oxide, or of soybean fatty acid with 30 mols of ethylene oxide, or of commercial oleylamine with 15 mols of ethylene oxide, or of dodecylmercaptan with 12 mols of ethylene oxide. Suitable anionic emulsifiers are, interalia, the sodium salt of dodecyl alcohol sulphuric acid ester, the sodium salt of dodecylbenzenesulphonic acid, the potassium or triethanolamine salt of oleic or abietic acid or of mixtures of these acids, or the sodium salt of a petroleum-sulphonic acid. Suitable cationic dispersants are quaternary ammonium compounds, for example, cetyl pyridinium bromide and dihydroxyethylbenzyl dodecyl ammonium chloride.

In the manufacture of dusting and casting preparations, there may be used, as solid vehicles, talcum, kaolin, bentonite, calcium carbonate or phosphate, or coal, cork meal, wood meal or other materials of vegetable origin. It is also very advantageous to manufacture the preparations in granular form. The different forms of application may contain the usual additives to improve the distribution, adhesion, stability towards rain or the penetration; as such substances there may be mentioned fatty acids, resins, glue, casein or alginates.

The present invention also provides new compounds having the general formula

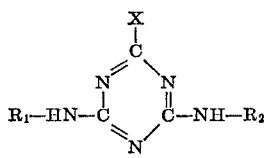

in which X repersents a chlorine atom or a methoxy or methylcercapto group, $R_1$ represents a lower alkyl or alkoxy-alkyl radical and $R_2$ represents a doubly branched alkyl radical containing 6 to 8 carbon atoms.

Apart from their herbicidal effect, the compounds of the general Formula I also display a biocidal action, for example, a microbicidal, insecticidal, acaricidal, nematocidal and molluscicidal action. The new compounds may also be used as cotton defoliants.

The following examples illustrate the invention, the parts and percentages being by weight unless otherwise indicated.

EXAMPLE 1

(1) 2 - chloro - 4 - ($\alpha,\delta$ - dimethyl-pentylamino) - 6-methylamino-1,3,5-triazine.

A total of 92 parts of $\alpha,\delta$-dimethyl-pentylamine is stirred in portions into a solution of 72 parts of 2,4-dichloro-6-methylamino-1,3,5-triazine in 1000 parts by volume of ethylenechloride, whereupon the temperature of the batch rises. The mixture is maintained at 45° C. until the reaction is complete, then washed with water, dried over anhydrous sodium sulphate, filtered and evaporated. The residue is crystallized from hexane; it melts at 115 to 117° C.

The following compounds are manufactured in a similar manner:

(2) 2 - ethylamino - 4 - chloro - 6 - ($\alpha,\delta$ - dimethyl-pentylamino)-1,3,5-triazine, melting at 105 to 108° C. (from alcohol), starting from 2-ethylamino-4,6-dichloro-1,3,5-triazine.

(3) 2 - chloro - 4 - ($\alpha,\delta$ - dimethyl-pentylamino) - 6-isopropylamino-1,3,5-triazine, melting at 121 to 124° C. (from hexane), starting from 2,4-dichloro-6-isopropylamino-1,3,5-triazine.

(4) 2 - secondary butylamino - 4 - ($\alpha,\delta$-dimethyl-pentylamino)-6-methoxy-1,3,5-triazine, highly viscous resin, starting from 2-secondary butylamino-4-chloro-6-methoxy-1,3,5-triazine, (5) 2 - ethylamino - 4 - ($\alpha,\delta$ - dimethyl-pentylamino)-6-methoxy-1,3,5-triazine, 77.7 parts of 2-chloro-4-($\alpha,\delta$-dimethyl-pentylamino)-6-methoxy-1,3,5-triazine are dissolved in 500 parts by volume of toluene, and 40 parts of aqueous monoethylamine of 68% strength are stirred in drop by drop, whereupon the temperature of the mixture rises. The batch is stirred at 45° C., until the aqueous phase reveals a neutral reaction. The organic phase is isolated and evaporated. The residue is distilled under a high vacuum. The product boils at 163° C. under a pressure of 0.1 mm. Hg.

The following were manufactured in a similar manner:

(6) 2 - ($\alpha,\delta$ - dimethyl-pentylamino) - 4 - methoxy - 6-methylamino-1,3,5-triazine, boiling at 163° C. under a pressure of 0.1 mm. Hg.

(7) 2 - ($\alpha,\delta$ - dimethyl-pentylamino) - 4 - methoxy - 6-($\gamma$-methoxypropylamino)-1,3,5-triazine, boiling at 176° C. under a pressure of 0.1 mm. Hg.

(8) 2 - ($\alpha,\delta$ - dimethyl - pentylamino) - 4 - ($\gamma$-methoxypropylamino) - 6 - methylmercapto - 1,3,5 - triazine, boiling at 185° C. under 0.1 mm. Hg pressure, starting from 2 - chloro - 4 - ($\alpha,\delta$ - dimethyl - pentylamino) - 6 - methylmercapto-1,3,5-triazine and $\gamma$-methoxypropylamine.

2-chloro-4-($\alpha,\delta$ - dimethyl-pentylamino)-6-methylmercapto-1,3,5-triazine is obtained in the following manner:

At a temperature of from 0 to 10° C. 115 parts of dimethylpentylamine and then 300 parts of sodium hydroxide solution of 20% strength are stirred in portions into a solution of 196 parts of 2,4-dichloro-6-methylmercapto-1,3,5-triazine in 200 parts by volume of toluene. The mixture is stirred at room temperature, until the reaction of the aqueous phase is neutral. The organic phase is separated, dried and evaporated, and the residue distilled under a high vacuum. The product boils at 180° C. under 0.1 mm. Hg pressure. It is a viscous oil, (9) 2 - ($\alpha,\delta$ - dimethyl - pentylamino) - 4 - methylamino-6-methylmercapto-1,3,5-triazine.

A solution of 54.8 parts of 2-chloro-($\alpha,\delta$ - dimethyl-pentylamino) - 6 - methylmercapto-1,3,5-triazine in 300 parts by volume of dioxane is heated to 40° C., and 17.5 parts of aqueous methylamine of 35.5% strength and then 40 parts of sodium hydroxide solution of 20% strength are added drop by drop. The mixture is stirred at 40° C. until its reaction is neutral. It is then diluted with 1000 parts by volume of toluene, washed with 2× 500 parts of water, dried and evaporated. The residue is distilled under a high vacuum and boils at 167° C. under 0.3 mm. Hg pressure.

In an analogous manner, the following are prepared:

(10) 2 - ethylamino - 4 - ($\alpha,\delta$ - dimethyl - pentylamino)-6-methylmercapto-1,3,5-triazine, boiling at 155° C. under 0.04 mm. Hg pressure.

(11) 2 - ($\alpha,\delta$ - dimethyl - pentylamino) - 4 - isopropylamino - 6 - methylmercapto - 1,3,5 - triazine, boiling at 182° C. under 0.04 mm. Hg pressure.

(12) 2 - chloro - 4 - ($\alpha,\gamma$ - dimethyl - butylamino) - 6-isopropylamino-1,3,5-triazine.

2,4 - dichloro - 6 - ($\alpha,\gamma$ - dimethyl - butylamino)-1,3,5-triazine is prepared in the usual manner from cyanuric chloride and $\alpha,\delta$-dimethyl-butylamine:

75 parts of 2,4-dichloro-6-($\alpha,\gamma$-dimethyl-butylamino)-1,3,5-triazine are dissolved in 250 parts by volume of toluene and while cooling with ice, 36 parts of isopropylamine are added drop by drop. The mixture is maintained at room temperature, then washed with water and evaporated. The residue, crystallized from toluene, melts at 141 to 144° C.

The following are prepared in an analogous manner:

(13) 2 - chloro - 4 - (α,γ - dimethyl - butylamino) - 6- (γ - methoxypropylamino) - 1,3,5 - triazine, melting at 111 to 119° C.
(14) 2 - (α,γ - dimethyl - butylamino) - 4 - methoxy - 6- (γ - methoxypropylamino) - 1,3,5 - triazine, boiling at about 150° C. under 0.1 mm. Hg pressure.
(15) 2 - (α,γ - dimethyl - butylamino) - 4 - methylamino-6-methylmercato-1,3,5-triazine.
(16) 2 - chloro - 4 - (α,γ - dimethyl - butylamino) - 6- methylamino - 1,3,5 - triazine, melting at 126 to 130° C. (from hexane).
(17) 2 - ethylamino - 4 - (α,γ - dimethyl - butylamino)-6-methoxy-1,3,5-triazine.
(18) 2 - ethylamino - 4 - chloro - 6 - (α,γ - dimethyl-butylamino)-1,3,5-triazine and
(19) 2 - (α,γ - dimethyl - butylamino) - 4 - isopropyl-amino-6-methylmercapto-1,3,5-triazine.

EXAMPLE 2

In each experiment, 10 parts of one of the compounds of Example 1 are mixed with 10 parts of a mixture of an anionic surface-active compound, preferably the calcium or magnesium salt of monolauryl-benzene-monosulphonic acid, and a nonionic surface-active compound, preferably a polyethyleneglycol ether of the monolauryl ester of sorbic acid, and the whole is diluted with xylene to 100 cc.

The resulting clear solution is used as a spray concentrate, which can be emulsified by pouring it into water.

EXAMPLE 3

The compound No. 11 of Example 1, formulated as described in Example 2, was sprayed in an amout of 2 kg. per hectare 10 days after seeding the test plants in the usual manner (test plants in the 1-2 leaf stage). The following results were attained:

Test plant (monocotyledons): Evaluation
Rice ------------------------------------ 3
Wheat ----------------------------------- 1
Millet ---------------------------------- 10
Meadow grass ---------------------------- 10
Orchard grass (dicotyledons) ------------ 10
Calendula ------------------------------- 10
Carrots --------------------------------- 3

Scale of evaluation: 0=no effect to 10=weeds completely destroyed.

In the case of compound No. 11, its effect against dicotyledonous weeds, especially against the grass weeds millet, meadow grass and orchard grass, as well as its good compatibility with rice and wheat should be specially mentioned.

I claim:

1. A preparation for combating weeds comprising as active ingredient a herbicidal amount of a compound of the formula

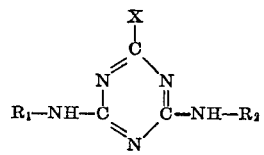

in which X represents a member selected from the group consisting of chlorine, the radical —OCH$_3$, and the radical —SCH$_3$, R$_1$ represents a member selected from the group consisting of lower alkyl and lower alkoxyalkyl, and R$_2$ represents doubly branched alkyl groups containing 6 to 8 carbon atoms.

2. The method for combating weeds which comprises applying to the area where the said effect is desired a herbicidal amount of a compound as set forth in claim 1.

References Cited

UNITED STATES PATENTS 3,303,015  2/1967  Speziale et al. -------- 71—93
3,257,192  6/1966  Luckenbaugh et al. ---- 71—93
3,185,561  5/1965  Acker ----------------- 71—93

FOREIGN PATENTS 694,406  9/1964  Canada.

LEWIS GOTTS, Primary Examiner

U.S. Cl. X.R.
71—74; 424—249